United States Patent
Pittiglio et al.

(10) Patent No.: US 7,828,325 B2
(45) Date of Patent: Nov. 9, 2010

(54) AIR-BAG AND A METHOD OF CONTROLLING PRESSURE WITHIN AN AIR-BAG

(75) Inventors: Antonella Pittiglio, Savigny sur Orge (FR); Alan Bradburn, Stoke on Trent (GB); Hugh Finn, Warrington (GB); Jack Johansson, Landvetter (SE); Marc Phillips, Burton Upon Trent (GB)

(73) Assignee: Autoliv Development AB, Vargarda (SE)

( * ) Notice: Subject to any disclaimer, the term of this patent is extended or adjusted under 35 U.S.C. 154(b) by 370 days.

(21) Appl. No.: 11/794,689

(22) PCT Filed: Dec. 23, 2005

(86) PCT No.: PCT/SE2005/002041
§ 371 (c)(1),
(2), (4) Date: Jul. 3, 2007

(87) PCT Pub. No.: WO2006/073350
PCT Pub. Date: Jul. 13, 2006

(65) Prior Publication Data
US 2009/0267333 A1    Oct. 29, 2009

(30) Foreign Application Priority Data
Jan. 5, 2005    (GB)    ................. 0500094.8

(51) Int. Cl.
*B60R 21/239* (2006.01)
(52) U.S. Cl. ............... 280/739; 137/843; 137/844; 137/859

(58) Field of Classification Search ......... 137/843–860; 280/739
See application file for complete search history.

(56) References Cited

U.S. PATENT DOCUMENTS

| 6,722,695 | B2 | 4/2004 | Kobayashi et al. |
| 2002/0140216 | A1 | 10/2002 | Kobayashi et al. |

FOREIGN PATENT DOCUMENTS

| DE | 3217464 A1 | 5/1983 |
| DE | 19630855 A1 | 7/1997 |
| EP | 1245461 A2 | 10/2002 |
| EP | 1288080 A2 | 3/2003 |
| FR | 2805505 A1 | 8/2001 |
| JP | 6286570 A | 10/1994 |
| JP | 11-192916 A | * 7/1999 |
| JP | 2002059803 A | 2/2002 |
| JP | 20041681277 A | 6/2004 |

* cited by examiner

*Primary Examiner*—Ruth Ilan
(74) *Attorney, Agent, or Firm*—Harness, Dickey & Pierce, P.L.C.

(57) ABSTRACT

An air-bag (1) is provided with a vent aperture (2). A membrane (3) extends across the vent aperture, the membrane defining a smaller aperture (4) than the vent aperture (2). The periphery of the aperture is defined by a thickened part of the membrane. The membrane is formed of an elastic material such as a silicone rubber material. When a very high pressure exists in the air-bag the vent becomes deformed, thus increasing the size of the aperture defined by the membrane, permitting a relatively large flow of air from the air-bag to reduce the pressure within the air-bag.

19 Claims, 1 Drawing Sheet

AIR-BAG AND A METHOD OF CONTROLLING PRESSURE WITHIN AN AIR-BAG

This application is a 371 US National Stage of International Application PCT/SE2005/002051, filed on Dec. 23, 2005, and published in English as WO 2006/073350 A1, which claims the benefit of foreign application GB 0500094.8, filed Jan. 5, 2005. The disclosures of the above applications are incorporated herein by reference.

THE PRESENT INVENTION relates to an air-bag and more particularly an air-bag provided with a vent.

Many types of air-bags have been proposed before for use in vehicles to provide protection for an occupant of the vehicle in the event that an accident should occur.

A typical air-bag is inflated in response to a signal from a sensor which senses an accident situation. The air-bag is inflated rapidly to form a cushion to restrain an occupant within the vehicle. If the occupant of the vehicle impacts with the inflated air-bag, the pressure of gas within the air-bag can rise. In such a situation it is desirable to vent gas from the air-bag.

If the air-bag is impacted at low velocity by a light occupant, only a minimum amount of gas needs to be vented from the air-bag. However, should the air-bag be impacted by a heavier occupant, then a greater amount of gas needs to be vented.

The present invention seeks to provide an air-bag provided with an exhaust vent which provides a desirable characteristic, with the exhaust vent being of a simple form.

According to one aspect of this invention there is provided an air-bag, the air-bag being provided with a vent aperture, the vent aperture being substantially closed by a membrane, the membrane defining a membrane vent aperture of a smaller diameter than the air-bag vent aperture, the membrane being formed of an elastic material, wherein the vent aperture is surrounded by a region of the membrane of increased thickness.

According to another aspect of this invention there is provided a method of controlling pressure within an air-bag, the method comprising the step of providing the air-bag with an air-bag vent aperture and providing a membrane extending across and substantially sealing the air-bag vent aperture, the membrane defining a membrane vent aperture, the membrane being formed of an elastic material, the membrane being such that when pressure is applied to one side of the membrane the membrane is deformed, thus increasing the size of the membrane vent aperture wherein the vent aperture is surrounded by a region of the membrane of increased thickness.

Preferably the membrane is formed of a silicone rubber material.

Conveniently the membrane has a tear resistance of a minimum value of 20 N.

Advantageously the membrane has a minimum bending stiffness of at least 20 N.

Preferably the membrane has a minimum breaking strength of at least 300 N.

Conveniently the membrane has a minimum percentage elongation of at least 450%.

Preferably the region of increased thickness defines the periphery of the membrane vent aperture. The membrane may be stitched to the fabric of the air-bag or may be glued, welded or moulded to the fabric of the air-bag.

In order that the invention may be more readily understood, and so that further features thereof may be appreciated, the invention will now be described, by way of example, with reference to the accompanying drawings in which.

Figure 1:
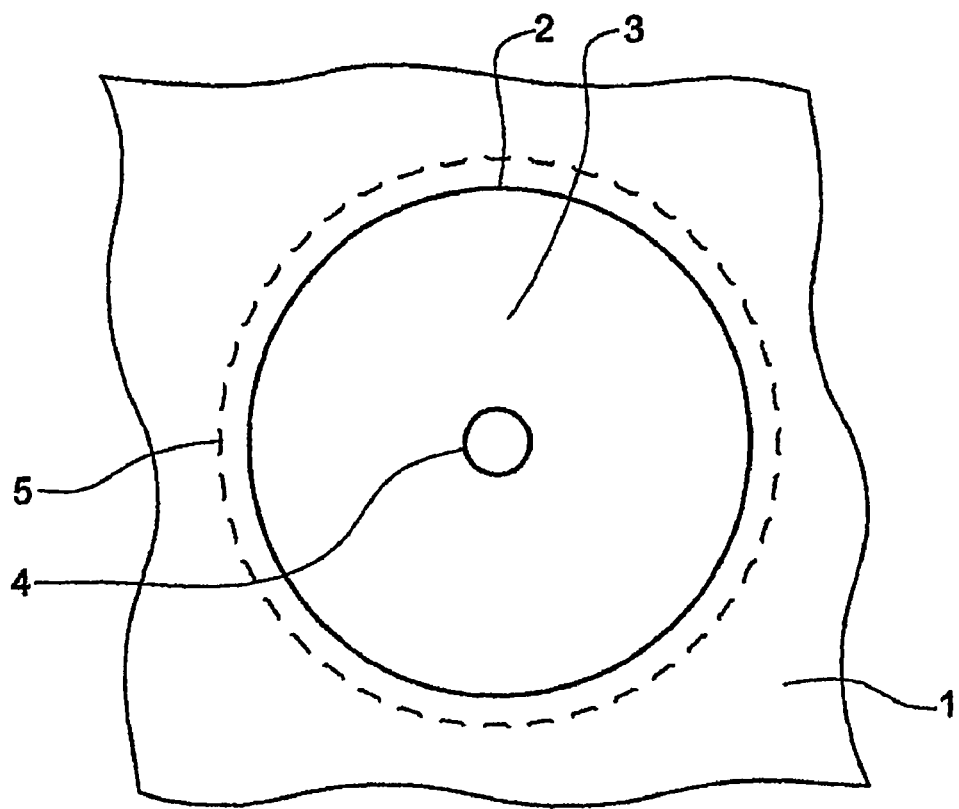
FIG. 1 is a diagrammatic view of part of an air-bag provided with a vent.

Referring initially to FIG. 1 of the accompanying drawings an air-bag is formed from fabric 1. An aperture 2 is formed in the air-bag to constitute a vent aperture. A deformable membrane 3 is provided, the membrane being provided with an aperture 4 which is substantially smaller than the vent aperture 2 formed in the fabric 1 of the air-bag. The membrane is secured to the fabric 1 of the air-bag by means of stitching 5 so that the membrane extends completely across the vent aperture 2 formed in the fabric 1, thus sealing the vent aperture apart from, of course, the relatively small aperture 4 formed in the membrane 3. As shown in FIG. 1 the small aperture 4 may be concentrically arranged with the vent aperture 2.

Figure 2:
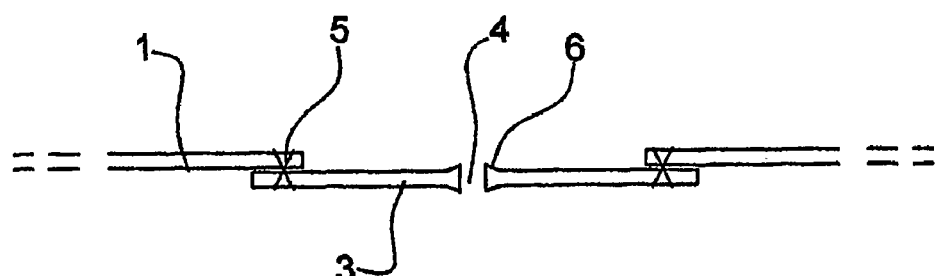
FIG. 2 is a sectional view through the vent of FIG. 1 when no pressure is applied to the vent.

It is to be observed that the thickness of the membrane is increased in a region surrounding the aperture 4. In the embodiment illustrated, as can be seen most clearly in FIGS. 2 and 3, the periphery of the aperture 4 is defined by a region 6 of increased thickness of the membrane 3 which immediately surrounds the aperture 4. However, the thickened region may surround the aperture 4 whilst being spaced slightly radially outwardly from the aperture 4. The purpose of the thickened region is to minimise the risk of the material of the membrane tearing during operation of the vent.

The membrane is a deformable membrane formed of a material with elastic properties, such as silicone rubber. The preferred membrane has a minimum tear resistance of 20 N, a minimum bending stiffness of 20 N and a minimum breaking strength of 300 N. The minimum percentage elongation is at least 450%. A minimum percentage elongation of 700% may be very satisfactory.

It is to be appreciated that the membrane 3, being formed of an elastic material, will tend to deform when subjected to pressure.

If the air-bag is inflated, the small aperture 4 will constitute a permanently open vent, through which gas may be vented from the interior of the air-bag. As mentioned above the presence of such a vent is desirable.

Figure 3:
FIG. 3 is a view corresponding to FIG. 2 illustrating the vent when pressure is applied to the vent.

However, should the pressure of gas within the air-bag rise, high pressure will be applied to the side of the membrane that is directed towards the interior of the air-bag, causing the membrane to deflect. The membrane deflects to have a "bell mouth" form. As the membrane deflects, so the diameter of the aperture 4 will increase, as shown in FIG. 3.

It is to be understood, therefore, that if an air-bag, on inflation, is struck by a relatively light occupant at a relatively low speed, the increase of pressure within the air-bag will be relatively low, causing only a minimum deflection of the membrane and consequently causing only a minimum increase in the size of the central venting aperture 4. However, if the air-bag is struck by a heavier occupant, in a relatively high speed accident, the pressure of gas within the air-bag will rise substantially, thus causing a much greater deformation of the air-bag, providing a much larger vent hole 4. The presence of the large vent hole counteracts the substantial rise in pressure and it is envisaged that by utilising a membrane of the type described above, a very desirable venting characteristic will be obtained. The effect of the membrane will be to lead to a situation where a substantially constant maximum pressure is maintained inside the air-bag regardless of the weight of the seat occupant impacting with the air-bag and regardless of the speed of the impact or severity of the accident situation, at least over a substantial range of possible impact speeds or accident severities.

It is to be appreciated that should pressure in the air-bag fall, the aperture 4 will tend to reduce towards its original size. This may prevent "striking through" of the bag by a large seat occupant.

Whilst the invention has been described with reference to an embodiment in which a membrane is stitched to an air-bag, it is to be appreciated that the membrane may be secured to the fabric of the air-bag in other ways. It may be glued, welded or moulded in position.

The preferred material for the membrane is a silicone rubber.

The invention claimed is:

1. An air-bag comprising:
    a first vent aperture defined by the air-bag, the first vent aperture being substantially closed by a membrane; and
    a second vent aperture defined by the membrane, the second vent aperture having a smaller diameter than the first vent aperture, the membrane being formed of an elastic material, the second vent aperture being concentrically oriented relative to the first vent aperture;
    wherein the membrane is formed of a material having a sufficient elasticity such that the membrane is deflected to a deflected form having a bell mouth shape in response to a pressure within the air-bag, the deflected form being generally conical in shape with a first diameter at a lower end and a second, smaller diameter at an upper end, the upper end being flared and defining the second vent aperture.

2. The air-bag according to claim 1, wherein the second vent aperture is surrounded by a region of the membrane of increased thickness.

3. The air-bag according to claim 2, wherein the region of increased thickness defines the periphery of the second vent aperture.

4. The air-bag according to claim 1, wherein the membrane has a tear resistance with a minimum value of 20 N.

5. The air-bag according to claim 1, wherein the membrane has a minimum breaking strength of at least 300 N.

6. The air-bag according to claim 1, wherein the membrane has a minimum percentage elongation of at least 450%.

7. The air-bag according to claim 1, wherein the membrane is secured to the fabric of the air-bag through a process selected from at least one of the group including stitching, gluing, welding and molding.

8. A method of controlling pressure within an air-bag, the method comprising:
    providing the air-bag with a fabric defining a first vent aperture;
    securing a membrane to the air-bag such that the membrane extends across and substantially seals the first vent aperture, the membrane defining a second vent aperture concentrically positioned relative to the first vent aperture, the membrane being formed of an elastic material;
    surrounding the second vent aperture with an increased thickness region of the membrane; and
    enlarging the second vent aperture of the membrane as a function of pressure within the air-bag.

9. The method according to claim 8, further comprising deforming the membrane when pressure is applied to one side of the membrane to thereby increase the size of the second vent aperture.

10. The method according to claim 8, wherein the membrane is formed of a silicone rubber material.

11. The method according to claim 8, wherein the membrane has a tear resistance of a minimum value of 20 N.

12. The method according to claim 8, wherein the membrane has a minimum bending stiffness of at least 20 N.

13. The method according to claim 8, wherein the membrane has a minimum breaking strength of at least 300 N.

14. The method according to claim 8, wherein the membrane has a minimum percentage elongation of at least 450%.

15. The method according to claim 8, wherein enlarging the second vent aperture includes deflecting the membrane to have a bell mouth form.

16. The method of claim 8, further comprising deflecting the membrane to a generally conical shape with a first outer diameter being greater than a second outer diameter.

17. An air-bag formed of fabric, the air-bag comprising:
    a first vent aperture formed in the fabric of the air-bag, and a membrane substantially closing the first vent aperture, the membrane being secured to the fabric of the air-bag and defining a membrane vent aperture of smaller diameter than the air-bag vent aperture, the membrane being formed of an elastic material, the first vent aperture being surrounded by a region of the membrane of increased thickness, the region of increased thickness defining the second vent aperture.

18. The airbag of claim 17, wherein the membrane is formed of a silicone rubber material having a tear resistance of a minimum value of 20 N, a bending stiffness of at least 20 N, a breaking strength of at least 300 N, and a minimum percentage elongation of at least 450%.

19. The airbag of claim 17, wherein the membrane is secured to the fabric of the air-bag through a process selected from at least one of the group including stitching, gluing, welding and molding.

* * * * *